United States Patent [19]

Mazdiyasni et al.

[11] 4,113,830
[45] Sep. 12, 1978

[54] METHOD OF FABRICATING SILICON NITRIDE BODIES

[75] Inventors: Khodabakhsh S. Mazdiyasni, Xenia; Charles M. Cooke, Dayton, both of Ohio

[73] Assignee: The United States of America as represented by the Secretary of the Air Force, Washington, D.C.

[21] Appl. No.: 452,038

[22] Filed: Mar. 18, 1974

[51] Int. Cl.$^2$ .............................................. C04B 35/58
[52] U.S. Cl. .................................. 264/101; 106/73.2; 106/73.5; 264/85; 264/332
[58] Field of Search ............... 264/65, 66, 85, 332, 264/101; 106/39.7, 65, 73.2, 73.5

[56] References Cited

U.S. PATENT DOCUMENTS 3,830,652  8/1974  Gazza ................................ 106/73.5

FOREIGN PATENT DOCUMENTS 745,546   11/1966  Canada ................................. 264/65
15,641 of  1910    United Kingdom .................... 264/65
970,639    9/1964  United Kingdom .................... 264/65

OTHER PUBLICATIONS

Gazza, "Hot pressed Si$_3$N$_4$," J. Am. Cer. Soc. 56 [12] p. 662.

Mazdiyasni et al., "Synthesis, Characterization, and Consolidation of Si$_3$N$_4$ Obtained from Ammonalysis of SiCl$_4$," J. Am. Cer. Soc., 56 [12] pp. 628–633.

Aboaf, "Some Properties of Vapor Deposited Silicon Nitride Films Obtained by the Reaction of SiBr$_4$ and NH$_3$", J. Electrochem. Soc., pp. 1736–1740, Dec. 1969.

Hackh's Chemical Dictionary, p. 771.

*Primary Examiner*—Robert F. White
*Assistant Examiner*—John A. Parrish
*Attorney, Agent, or Firm*—Joseph E. Rusz; Cedric H. Kuhn

[57] ABSTRACT

In a method for fabricating highly dense, polycrystalline silicon nitride bodies, a mixture of silicon nitride powder and an oxide, hydride or nitride of an element of the lanthanide series in powder form is hot pressed at a temperature ranging from 1600° to 1750° C for a period of 30 to 60 minutes. The method is particularly useful for fabricating structural components, such as stators, blades, airfoils and buckets in high performance gas turbine engines.

10 Claims, No Drawings

METHOD OF FABRICATING SILICON NITRIDE BODIES

RIGHTS OF THE GOVERNMENT

The invention described herein may be manufactured and used by or for the Government of the United States for all governmental purposes without the payment of any royalty.

FIELD OF THE INVENTION

This invention relates to a method for fabricating silicon nitride bodies. In one aspect it relates to a novel sintering aid for use in the pressure sintering of silicon nitride powder.

BACKGROUND OF THE INVENTION

The use of ceramics in the fabrication of structural components possessing good mechanical properties at high temperatures has in recent years been the subject of intensive research. Because it exhibits high strength at elevated temperatures and excellent thermal shock, creep and oxidation resistance, silicon nitride has been of particular interest.

The usual procedure in fabricating structural components from silicon nitride is to reaction sinter, hot press or pressure reaction sinter particulate silicon nitride in admixture with a sintering aid, such as magnesium oxide or alumina. To obtain a structural component having optimum physical properties, it is necessary that the silicon nitride be of very high purity and in finely divided form. Also, alpha phase silicon nitride powder or a precursor therefor should be used as the starting material because higher strength and more uniform structures are obtained by hot pressing than when beta phase silicon nitride is present in any appreciable amount in the starting material. Still further, the sintering aid used must be in finely divided form, of high purity and of a nature such that it will not have an adverse effect upon the physical properties of the compressed article. In other words the sintering aid must not be such that it will function as an impurity in degrading physical properties.

It is an object of this invention to provide an improved method for fabricating articles from silicon nitride.

Another object of the invention is to provide new and improved sintering aids for use with silicon nitride in fabricating articles by hot pressing.

Other objects and advantages of the invention will become apparent to those skilled in the art upon consideration of the accompanying disclosure.

SUMMARY OF THE INVENTION

Broadly speaking, the present invention resides in the discovery that oxides, hydrides and nitrides of elements of the lanthanide series can be used as sintering aids in the hot pressing of alpha silicon nitride or precursors therefor to produce highly dense, polycrystalline bodies that exhibit high strength at elevated temperatures and are resistant to creep and thermal shock. The high temperature properties of the bodies result from their unique microstructure that is in the form of elongated, interlocking fine grains. As a result of this discovery, the method of this invention can be advantageously employed in fabricating parts requiring high mechanical properties in a high temperature environment, such as in the fabrication of turbine stators, turbine vanes, rocket nozzle liners, automotive engine liners, and radomes.

In carrying out the method of this invention, alpha silicon nitride powder or precursor therefor is thoroughly mixed with the sintering aid which is in a finely divided form. Thereafter, the mixture is compressed under a vacuum, e.g., $10^{-6}$ to $10^{-3}$ torr, or in an inert atmosphere at an elevated pressure in a compression zone formed of graphite and lined with a sheet of graphite while maintaining the zone at a temperature in the range of 1600° to 1750° C. When carrying out the compression step in an inert atmosphere, nitrogen, argon, helium and the like can be utilized. The compression step is generally conducted at a pressure ranging from about 4000 to 6000 psi and is continued until a compacted article is obtained having a density substantially equal to the theoretical density of silicon nitride. The theoretical density of silicon nitride is about 3.2 g/cc. A period of time in the range of about 30 to 60 minutes is usually sufficient to obtain the desired densification. At the end of the compression step, the die or mold is allowed to cool to room temperature after which the molded body is removed from the die.

It is critical that the compression step be conducted at a temperature in the above-mentioned range in order to convert the starting material to beta phase silicon nitride and thereby obtain a microstructure characterized by elongated, interlocking fine grains. Temperatures below 1600° C. result in a mixed alpha-beta phase silicon nitride while temperatures above 1750° C. result in degradation of silicon nitride to silicon and nitrogen with a considerable weight loss. Both of these results are undesirable if an article having optimum physical properties is to be obtained as the product.

The alpha silicon nitride and precursors therefor employed in the method are high purity materials, e.g., 99.95 percent and higher, which are in the form of powders of submicron size. Starting materials meeting these requirements can be prepared by a process in which initially liquid silicon tetrachloride of at least 99.95 percent purity is reacted with excess anhydrous ammonia gas in dry normal hexane at about 0° C. The reaction that occurs is shown by the following equation:

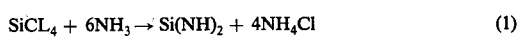

$$SiCL_4 + 6NH_3 \rightarrow Si(NH)_2 + 4NH_4Cl \qquad (1)$$

The white precipitate that forms is dried by removing the n-hexane by vacuum distillation, thereby yielding a silicon diimide-ammonium chloride mixture in finely divided form.

The silicon diimide-ammonium chloride mixture is next heated under a vacuum or a blanket of an inert gas in a container which is non-reactive with the reactants. A container made of quartz, graphite or recrystallized alumina can be conveniently used. To obtain alpha silicon nitride, the mixture is heated from room temperature to a temperature in the range of 1200° to 1350° C. at which temperature it is maintained for a period of about 2 to 8 hours. The alpha silicon nitride, which is then allowed to cool to room temperature while still under a vacuum or a blanket of an inert gas, is recovered in the form of submicron particulates having a particle size of 100 to 300 angstroms.

During heating of the silicon diimide-armmonium chloride mixture, several reactions occur as shown by the following equations:

$$nSi(NH_2NH_4Cl \xrightarrow{360°C} 4NH_4Cl \uparrow + [Si(NH)_2]_n \qquad (2)$$

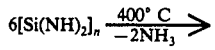

$$6[Si(NH)_2]_n \xrightarrow[-2NH_3]{400° C} \quad (3)$$

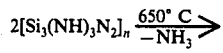

$$2[Si_3(NH)_3N_2]_n \xrightarrow[-NH_3]{650° C}$$

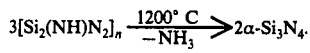

$$3[Si_2(NH)N_2]_n \xrightarrow[-NH_3]{1200° C} 2\alpha\text{-}Si_3N_4.$$

As seen from equation (2), the ammonium chloride is sublimed leaving $[Si(NH)_2]_n$, an inorganic polymer. Further heating of $[Si(NH)_2]_n$ results in the formation of two intermediate species prior to obtaining alpha silicon nitride as seen from equation (3). Furthermore, at temperatures below 1200° C., e.g., between 1000° and 1200° C., the silicon nitride passes through an amorphous state prior to formation of the alpha silicon nitride. Thus, polymeric silicon diimide $[Si(NH)_2]_n$ and amorphous silicon nitride are precursors of alpha silicon nitride and as such can be used as starting materials in practicing the method of this invention. When the precursors are used, during the hot pressing they are converted to alpha silicon nitride which is in turn converted to beta silicon nitride as discussed above.

For a more detailed discussion of the above-described method for synthesizing alpha silicon nitride reference may be made to our copending U.S. patent application Ser. No. 447,424, filed on Mar. 1, 1974, the disclosure of which is incorporated herein by reference. It is to be understood that powders of alpha phase silicon nitride from commercial sources which are of high purity and fine particle size may be used with the sintering aids of this invention to obtain high density, polycrystalline silicon nitride bodies.

The sintering aids which are used in the practice of the present method are the oxides, hydrides or nitrides of an element of the lanthanide series, i.e., cerium (Ce), praseodymium (Pr), neodymium (Nd), samarium (Sm), europium (Eu), gadolinium (Gd), terbium (Tb), dysposium (Dy), holmium (Ho), erbium (Er), thulium (Tm) and ytterbium (Yb). The compounds can be represented by the following formulas: $M_2O_3$, $MH_3$ and $MN$, where M is one of the aforementioned lanthanides. The sintering aids are in the form of a powder having a particle size comparable to that of the alpha silicon nitride or precursor therefor. The amount of sintering aid used generally falls in the range of 0.5 to 10, preferably 1 to 5, weight percent of the alpha silicon nitride or precursor therefor. The sintering aid and the silicon nitride or precursor therefor are thoroughly mixed prior to hot pressing so as to form a homogeneous mixture. A vibrating mixer can be conveniently employed, or the compounds can be mixed in a cylindrical container rotated on a roll mill. Where only small quantities are involved, they can be mixed by placing them in a glass flask and shaking the flask by hand. In any event it is important to avoid the use of mixing methods employing metal, metal oxide or metal carbide balls so as to prevent the introduction of impurities.

The primary function of the sintering aids is to promote densification of the silicon nitride powder during hot pressing. In a secondary function, the sintering aids act as scavengers or fugitive vehicles for any impurities, such as oxygen or silicon, that may be present in the silicon nitride. When acting as a scavenger, a sintering aid forms a high temperature stable phase without significantly affecting the physical and thermomechanical properties of the silicon nitride body. All of the sintering aids except the cerium compounds act as scavengers in tying up impurities present in the silicon nitride bodies. Since the cerium compounds ($Ce_2O_3$, $CeH_3$ and $CeN$) either melt or decompose at a relatively low temperature in the range of 1000°–1700° C., these compounds act as liquid phase sintering aids and as fugitive vehicles in the silicon nitride system. After aiding densification of the silicon nitride, the cerium compounds leave the compacted bodies taking with them impurities that may have been present. Because the bodies are free of or substantially free of cerium per se or its compounds, there is no possibility of these fugitive vehicles having an adverse effect on the physical properties of the silicon nitride bodies. When sintering aids are used that function as scavengers as do the other sintering aids of this invention except the cerium compounds, there is the possibility, e.g., under extreme use conditions, that the presence of scavengers in the silicon nitride bodies may have a deleterious effect upon their properties. Accordingly, the cerium compounds, particularly cerium oxide ($Ce_2O_3$), are preferred for use as sintering aids in the practice of the present invention.

Of the sintering aids generally, it is preferred to use the oxides of elements of the lanthanide series. Furthermore, because of their high purity and submicron size, it is especially desirable to employ oxide powders prepared as disclosed by K. S. Mazdiyasni et al in U.S. Pat. No. 3,757,412. As disclosed therein lanthanide isopropoxides are prepared by the reaction of metal turnings with excess isopropyyl alcohol in the presence of mercuric iodide or a mixture of mercuric chloride and mercuric acetate. The oxides are then obtained by hydrolytic decomposition, e.g., by adding distilled water to an isopropoxide to form the hydroxide which is then heated under a vacuum at about 60° C. to form the hydrated oxide followed by calcination at 400° to 500° C. to provide the submicron oxide powder. It is to be understood that commercially available lanthanide oxides, hydrides and nitrides may also be used as the sintering aids.

A more complete understanding of the invention can be obtained by referring to the following illustrative examples which are not intended, however, to be unduly limitative of the invention.

EXAMPLE I

A series of runs was conducted in which articles in the form of billets were prepared in accordance with the method of this invention. In each run 200 grams of inorganic polymer of silicon diimide prepred as described above was calcined in a nitrogen atmosphere at a temperature in the range of 1100° to 1200° C. for 1 hour. Each of three batches of amorphous silicon nitride so prepared was then separately mixed with 5 grams of $Ce_2O_3$, 6 grams of $CeH_3$ or 6 grams of $CeN$ powders. Each mixture was then hot pressed, thereby producing substantially theoretically dense billets which were 6.35 cm in diameter and 0.5 cm high. The procedure followed in each operation was to pour the powder into a conventional hot pressing die made from graphite and lined with a sheet of graphite (Grafoil flexible graphite — Union Carbide Corp.). This assembly with a plunger in place was then placed in a Vacuum Industries 15 kw hot press wherein the mixture was subjected to a pressure of about 5000 psi at a temperature of about 1675° C. These conditions were maintained for a period of about 45 minutes. The assembly was then allowed to cool to room temperature after which the assembly was removed from the vacuum hot press and the silicon nitride billet was recovered from the die.

The billets, grey, greyish green or greenish brown in color, had densities of greater than 99 percent of theoretical as measured by the standard Archimedes method.

The billets were examined by electron microscopy after etching with 7:2:2 concentrated $H_2SO_4$:HF:$NH_4F$ solution in Teflon containers at 300° C. for 30 to 45 minutes. The electron micrographs showed elongated or acicular grains with an average grain diameter of 0.2 to 1 m$\mu$. The electron diffraction patterns also indicated beta phase silicon nitride. There was no evidence of a second phase within or along the grain boundaries as determined by electron microraphs.

The billets were tested in four point bending on an Instron testing machine at a cross head speed of 0.005 in/min. The load was applied by hardened steel pins 0.8 inch apart while the bars were supported by pins 1.6 inches apart. The four point bend strengths of the billets were in the range of 120 to 150 kpsi. The Young's modulus of elasticity of the billets was in the range of 50 to $70 \times 10^6$ psi. The four point bend, high temperature creep, 10 kpsi load, indicated strain rates $E_{ss} = 4.17 \times 10^{-6}$ hr at 1300° C., $E'_{ss} = 1.07 \times 10^{-4}$ hr at 1350° C. and finally $E''_{ss} = 7 \times 10^{-4}$ hr at 1400° C. in air. The 100 gram Knoop microhardness was uniformly 2550–2600 across the silicon nitride samples.

EXAMPLE II

One hundred grams of submicron alpha silicon nitride, synthesized as described above, was mechanically mixed with 5 grams of $Ce_2O_3$, also prepared as described above. The mixture was hot pressed according to the procedure and under substantially the same conditions as described in Example I. The silicon nitride compact obtained had the same high density and microstructure and exhibited substantially the same physical properties as those described in in Example I. As determined by emission spectroscopy, the compact contained about 3000 ppm of cerium (about 0.3 weight percent).

EXAMPLE III

A series of runs was conducted in which billets were fabricated by separately mixing each of 5 grams of $La_2O_3$, 5 grams of $Yb_2O_3$, 5 grams of $Gd_2O_3$ and 5 grams of $Dy_2O_3$ with amorphous silicon nitride. Each batch of silicon nitride employed was prepared by calcining 200 grams of inorganic polymer in a nitrogen atmosphere at a temperature of about 1150° C. for 1 hour. Each mixture was not pressed in substantially the same manner as described in Example I. The silicon nitride compacts obtained had the same high density and microstructure and exhibited substantially the same physical properties as those described in Example I.

EXAMPLE IV

Two runs were carried out in which alpha silicon nitride, prepared as described above, was used. In one run 100 grams of the nitride was mechanically mixed with 6 grams of $CeH_3$ while in the other run the same amount of the nitride was mechanically mixed with 6 grams of CeN. In each run, the mixing was carried out in an inert atmosphere. Each mixture was hot pressed in substantially the same manner as described in Example I. The silicon nitride billets obtained had the same high density and microstructure and exhibited substantially the same physical properties as those described in Example I.

EXAMPLE V

Two hundred grams of polymeric silicon diimide $[Si(NH)_2]_n$, prepared as described above, was mixed with 5 grams of submicron size $Ce_2O_3$. The mixture was then hot pressed under a vacuum, following the procedure described in Example I. The silicon nitride billet obtained had the same high density and microstructure and exhibited substantially the same physical properties as those described in Example I.

EXAMPLE VI

A run was carried out in which amorphous silicon nitride was mixed with 5 grams of $Ce_2O_3$ as described in Example I. The mixture was then hot pressed according to the procedure described in Example I except that a temperature greater than 1750° C. was employed. X-ray analysis indicated free silicon. However, electron probe analysis of samples indicated a homogeneous dispersion of silicon in the silicon nitride matrix.

From the data shown in the above examples, it is seen that the present invention provides a method for fabricating highly dense, polycrystalline bodies of silicon nitride having outstanding physical properties. The high temperature creep values are particularly significant since they are of an order of magnitude smaller than the values of conventionally prepared silicon nitride bodies. In the fabrication of high temperature turbine engine parts, it is very important that the silicon nitride components have this property, i.e., resistance to thermal creep. As a starting material in the hot pressing, alpha silicon nitride, amorphous silicon nitride, or polymeric silicon diimide can be used. When a cerium compound is used as the sintering aid, as shown in Example II, substantially no cerium remains in the body. As shown in Example VI, use of a hot pressing temperature above 1750° C. results in bodies containing free silicon as a major impurity dispersed in a silicon nitride matrix.

As will be evident to those skilled in the art, modification of the present invention can be made in view of the foregoing disclosure that falls within the spirit and scope of the invention.

We claim:

1. A method for fabricating a silicon nitride body which comprises compressing under a vacuum or in an inert atmosphere a mixture of (1) a silicon compound selected from the group consisting of alpha silicon nitride, amorphous silicon nitride and polymeric silicon diimide powders and (2) 0.5 to 10 weight percent, based on the weight of the silicon compound, of a sintering aid in finely divided form selected from the group consisting of compounds having the formulas $M_2O_3$, $MH_3$ and MN, where M is an element of the lanthanide series at a pressure ranging from about 4000 to 6000 psi and at a temperature ranging from 1600° to 1750° C. in a compression zone formed of graphite and lined with a sheet of graphite; and continuing the compression step until there is obtained a silicon nitride body having a density substantially equal to the theoretical density of silicon nitride.

2. The method according to claim 1 in the mixture is compressed under a vacuum of $10^{-6}$ to $10^{-3}$ torr.

3. The method according to claim 1 in which the mixture is compressed under a blanket of an inert atmosphere.

4. The method according to claim 1 in which the sintering aid is $Ce_2O_3$, $CeH_3$ or $CeN$.

5. The method according to claim 1 in which the sintering aid is $La_2O_3$.

6. The method according to claim 1 in which the sintering aid is $Yb_2O_3$.

7. The method according to claim 1 in which the sintering aid is $Gd_2O_3$.

8. The method according to claim 1 in which the sintering aid is $Dy_2O_3$.

9. The method according to claim 1 in which the silicon compound is polymeric silicon diimide.

10. A method for fabricating a silicon nitride body which comprises compressing under a vacuum of $10^{-6}$ to $10^{-3}$ torr a mixture of (1) a silicon compound selected from the group consisting of alpha silicon nitride, amorphous silicon nitride and polymeric silicon diimide powders and (2) 0.5 to 10 weight percent of submicron size $Ce_2O_3$, based on the weight of the silicon compound, at a pressure ranging from about 4000 to 6000 psi and at a temperature ranging from 1600° to 1750° C. in a compression zone formed of graphite and lined with a sheet of graphite; and continuing the compression step until a silicon nitride body is obtained which is substantially free of cerium and has a density substantially equal to the theoretical density of silicon nitride.

* * * * *